(12) United States Patent
Adler et al.

(10) Patent No.: US 7,169,435 B2
(45) Date of Patent: Jan. 30, 2007

(54) PROCESS FOR PRODUCTION OF RAW CURED MEAT PRODUCTS

(75) Inventors: Peter Adler, Bonndorf (DE); Klaus Josef Hoegg, Bonndorf (DE)

(73) Assignee: Hans Adler OHG, Bonndorf (DE)

( * ) Notice: Subject to any disclaimer, the term of this patent is extended or adjusted under 35 U.S.C. 154(b) by 243 days.

(21) Appl. No.: 10/403,680

(22) Filed: Mar. 31, 2003

(65) Prior Publication Data

US 2005/0074539 A1 Apr. 7, 2005

(51) Int. Cl.
*A23L 1/314* (2006.01)
(52) U.S. Cl. ...................... 426/641; 426/513
(58) Field of Classification Search ............... 426/641, 426/389, 513
See application file for complete search history.

(56) References Cited

U.S. PATENT DOCUMENTS 4,659,578 A * 4/1987 Schlegel ................. 426/418
5,670,195 A 9/1997 Palmer

FOREIGN PATENT DOCUMENTS

| DE | 31 06 265 A1 | 9/1982 |
| DE | P 40 00 296.6 | 7/1991 |
| DE | P 41 22 514.7 | 2/1993 |
| DE | P 43 26 176.0 | 2/1994 |
| DE | 196 21 701 A1 | 2/1997 |

OTHER PUBLICATIONS

Derwent-ACC-No. 1986-119361, Apr. 16, 1986.*
Pearson, A.M.; Tauber, F.W.: Processed Meats. 2. Auflage. Westport, Connecticut 06881: The AVI Publishing Company, Inc, 1984 S. 61-62. ISBN: 0-87055-461-1.

* cited by examiner

*Primary Examiner*—Arthur L. Corbin
(74) *Attorney, Agent, or Firm*—Akerman Senterfitt; Stephan Pendorf; Peter Chiabotti

(57) ABSTRACT

For process for production of raw ham a deboned ham is weighed and preferably its pH-value is determined. The hams are individually introduced into shaping containers having watertight walls, wherein they are salted with a salt amount, which is calculated based upon the weight and preferably the pH-value. The shaping containers are stacked, so that the ham is shaped under pressure in these shaping containers, wherein they are held in the brine filled shaping containers with exclusion of air.

10 Claims, 2 Drawing Sheets

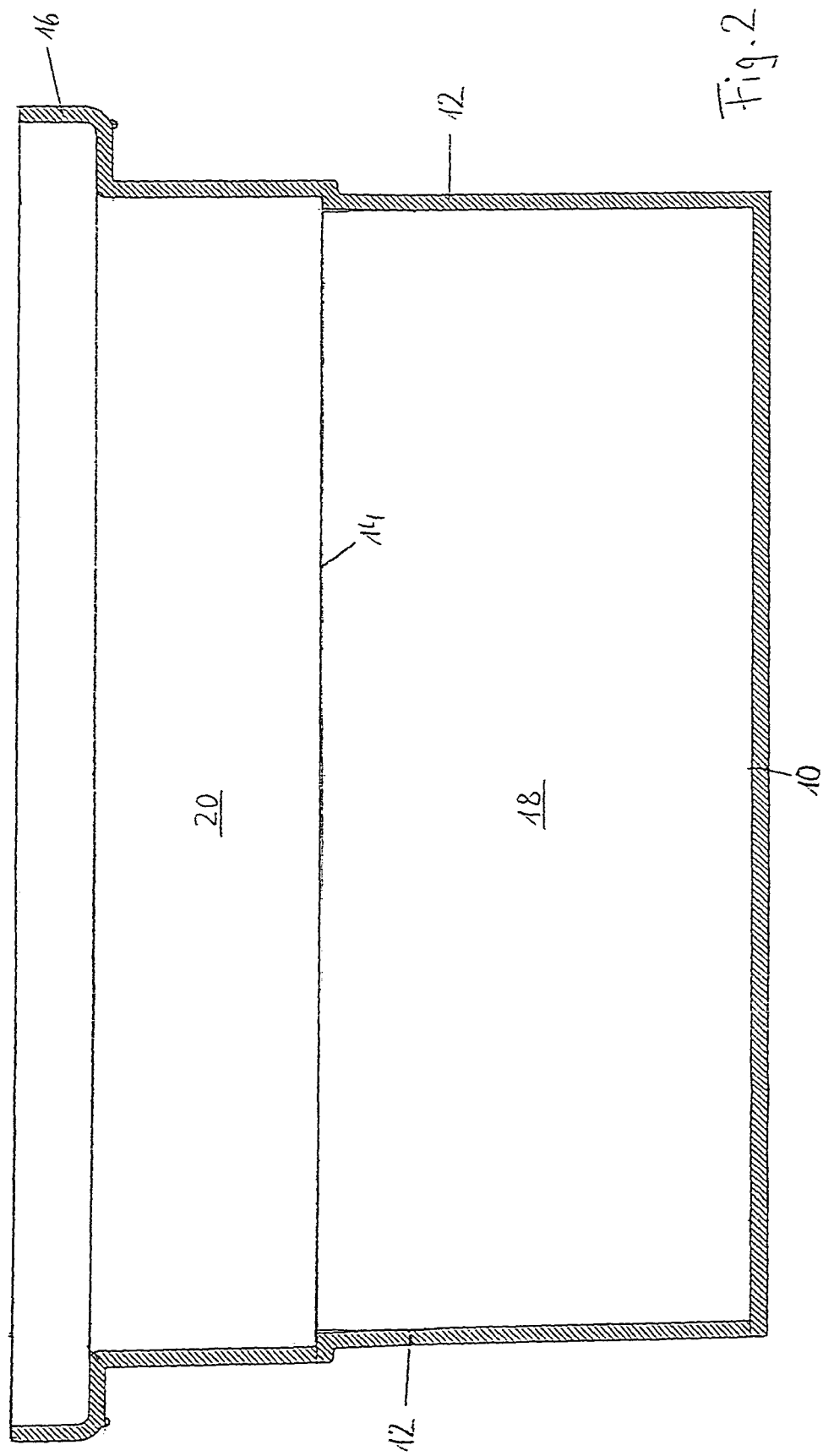

PROCESS FOR PRODUCTION OF RAW CURED MEAT PRODUCTS

BACKGROUND OF THE INVENTION

Field of the Invention

The invention concerns a process for production of raw cured products, in particular raw ham according to the precharacterizing portion of claim 1.

For production of cured ham, for example Black Forest ham, pork shoulders are de-boned, that is, bones are removed from the ham.

Then the meat pieces are cured, that is, rubbed down with a mixture of salt as well as in certain cases herbs and sugar(s). The amount of salt that adheres depends in large part upon the size or surface area of the piece of ham. Up to 200 of such treated ham pieces are layered in a large container for salting-through; during this storage as a result of osmosis a so-called "natural brine" occurs, which collects in the lower hams of the container and within itself forms a layering of the salt concentration.

Since as a rule not enough salt remains adhered during the first salting, and since this salt is further partially rinsed away by the formation of the natural brine, it is conventional to resalt the ham after a certain period of time, that is, the ham is to be rubbed-in with salt a second time and at this time needs to be reverse-stack, in order to balance out the influences of the differing brine layers. In addition to these natural brines, in some localities additional brine is poured on in order to keep the ham completely covered and to exclude air. In order to bring the ham into contact with brine evenly and on all sides, it is necessary to repack the ham one or more times in the container depending upon the size or, as the case may be, salt-time of the ham, that is, the ham is to be reverse-layered without further addition of salt. The re-salting or, as the case may be, repacking, is hard manual labor. In this process the taken-up salt content is subject to other influences such as length of time of salting, pH-value, temperature, etc. as well as the size or as the case may be surface area of the ham. After storage for several weeks the hams are removed from the container and dried. In most types of ham, for example Black Forest ham, smoking is carried out following drying or together with drying.

If the ham is sold in slices, in particular is already cut and packaged during the manufacturing process, then it is desired for all ham slices to have substantially the same size. For this it is known to press the ham into a cubic shape. From DE 41 22 514 C1 it is known to press the ham into square-shaped lattice baskets and to store this lattice basket in the brine filled container. By this curing procedure, the ham pressed in the lattice basket obtains a form-stability, so that following removal from the brine and the lattice basket it substantially maintains its quadratic shape.

At the end of the manufacturing process the ham should be salted evenly through it's entire volume, with a predetermined salt concentration. The amount of salt which the ham must take up and which must be supplied to it during the salting process is thus dependent upon the weight of the ham. In the conventional processes the hams are sorted based on their size, and hams of respectively substantially the same weight are stored in one container. Thereby it is to be achieved that all hams salted in the brine are to be salted to the same salt content. This is however not possible in optimal manner, since different salt concentrations develop in the brine in the container. This is based upon the fact that on the one hand the brine between the hams does not sufficiently circulate and on the other hand that a layering of the salt concentration develops. In order to prevent this, it is known for example from DE 40 00 296 C1 to keep the hams spaced apart from each other in the brine using the lattice baskets, and to stir up the brine using a stirring mechanism.

A further problem is comprised therein, that the salt uptake of the ham depends upon the pH-value. A low pH-value of the meat of the pork shoulder facilitates salt uptake, while a high pH-value impedes salt uptake. It is thus conventional to measure the pH-value of the pork shoulders and to use only the pork shoulders with low pH-value for production of raw ham, while the pork shoulders with high pH-value are processed into dried ham. Thereby a portion of the starting material becomes lost for use for the higher-value raw ham. Also, the starting material processed further into raw ham exhibits great variations in pH-value, which leads to varying quality of the end product.

SUMMARY OF THE INVENTION

The invention is concerned with the task of providing a process for production of raw cured products, in particular raw ham, which results in a improved quality of the end product and in particular to less of a quality variation of the end products.

This task is inventively solved by the process with the characteristics of claim 1.

Advantageous embodiments of the invention can be found in the dependent claims.

A preferred embodiment of the inventive process will be described in greater detail the following production of raw ham as an example:

For curing the ham a shaping container is employed, which is made of plastic or stainless steel. The shaping containers have a quadratic shape, wherein the floor and the sidewalls are closed, so that the shaping container forms a watertight basin. The shaping containers are open on the upper side. In their upper higher area the shaping containers are widened, so that they can be stacked into each other. When stacked the floor of one shaping container engages respectively in the widened upper area of the thereunder located shaping container. The shaping containers are preferably made up into different varying sizes, which correspond to varying ham sizes. For example, four different sizes of the shaping container are employed.

The fresh de-boned hams, following pH measurement, are first introduced into a first general weighing station for size classification, for assignment to the various sizes of the shaping containers. If for example four different sizes of the shaping containers are employed, then the de-boned hams are subdivided into four appropriate size classes.

Following this pre-classification the hams are individually weighed. The optimal salt amount corresponding to the determined ham weight and the subsequently measured pH-value is determined using a computer. The ham is then rubbed-in with a corresponding amount of salt and laid or embedded in a shaping container of the associated size class. Thereupon, by weighing, the missing salt amount is added to the ham until the computed salt amount is precisely achieved.

The shaping containers filled in this manner with the salted hams and the brine are sorted and stacked according to their size class, whereby they are preferably stacked upon suitable pallets. When the shaping containers are stacked, due to the widened upper area, the respective upper shaping container sits with its floor upon the ham lying in the there-under located shaping container. Thereby the hams are pressed in their shaping container by the weight of the respective above-located shaping container, so that they take the shape thereof. By the pressing-in of the ham in the shaping container it is thereby caused that the ham is completely submerged in the brine filling its shaping container, and by the seating upon of the above-located shaping container, it is kept submerged below the surface of the brine. The ham is therewith held completely submerged in the brine of its shaping container with exclusion of air. On top of the uppermost shaped container of each stack there is respectively seated one empty shaping container, which is loaded with suitable weights, in order to press also the ham in the uppermost filled shaping container. The stack of the shaping containers is held on the pallets by belts, clamps or the like.

Since each individual ham is provided with the salt amount precisely appropriate to its weight and possibly pH-value and is located in its individual shape container with the individualized dosed amount of brine, an optimal quality of curing for each ham is achieved. Besides this, variation in quality between the individual hams is avoided. Since each ham is located in an individual shaping container, an even salt distribution over the entire surface of the ham is guaranteed, without requiring any redistribution or movement of the hams during the curing storage.

The hams are held in their shaping containers in the brine with exclusion of air for a duration of, for example, 3–5 weeks. The duration of storage is in particular selected corresponding to the size of the hams. On the basis of the pre-classification of the ham sizes and the corresponding sizes of the shaping container there results a uniform storage for the hams of each size class, respectively, that is, for the shaping containers of the same size stacked in common upon one pallet.

Following the predetermined duration of storage the hams are removed from the shaping containers. Since the hams already exhibit a sufficient form stability following this curing, they can now be smoked or dried without smoking following a washing process for removal of their remaining brine, depending upon type of ham. On the basis of the shape stability it is therein possible to lay the hams upon grates, for example of a smoking wagon, so that it is guaranteed, that the hams only lie at a few points upon the grate such that the smoke has unimpeded access to all sides of the ham surface.

Since each ham is placed in an individual shaping container, the hams do not come into direct contact with each other. Thereby it is substantially precluded, that any microbiological cross-contamination between the hams occurs. There is beyond this also the possibility to introduce starter cultures into the shaping containers for the respective hams, which would facilitate the development of a microbiological flora advantageous for the curing process and which would suppress the development of a disadvantageous microbiological flora.

The inventive process is not limited to the production of raw hams, but rather can be employed for production of the most diverse cured products, such as for example curing of pork chops, bacon, ribs, etc.

BRIEF DESCRIPTION OF THE DRAWING

An illustrative embodiment of the shaping containers employed in the inventive process is shown in the figures. Therein there is shown FIG. 1 a side view of the shaping container and FIG. 2 a vertical section through the container according to section line A—A in FIG. 1.

DETAILED DESCRIPTION OF THE INVENTION

Figure 1:
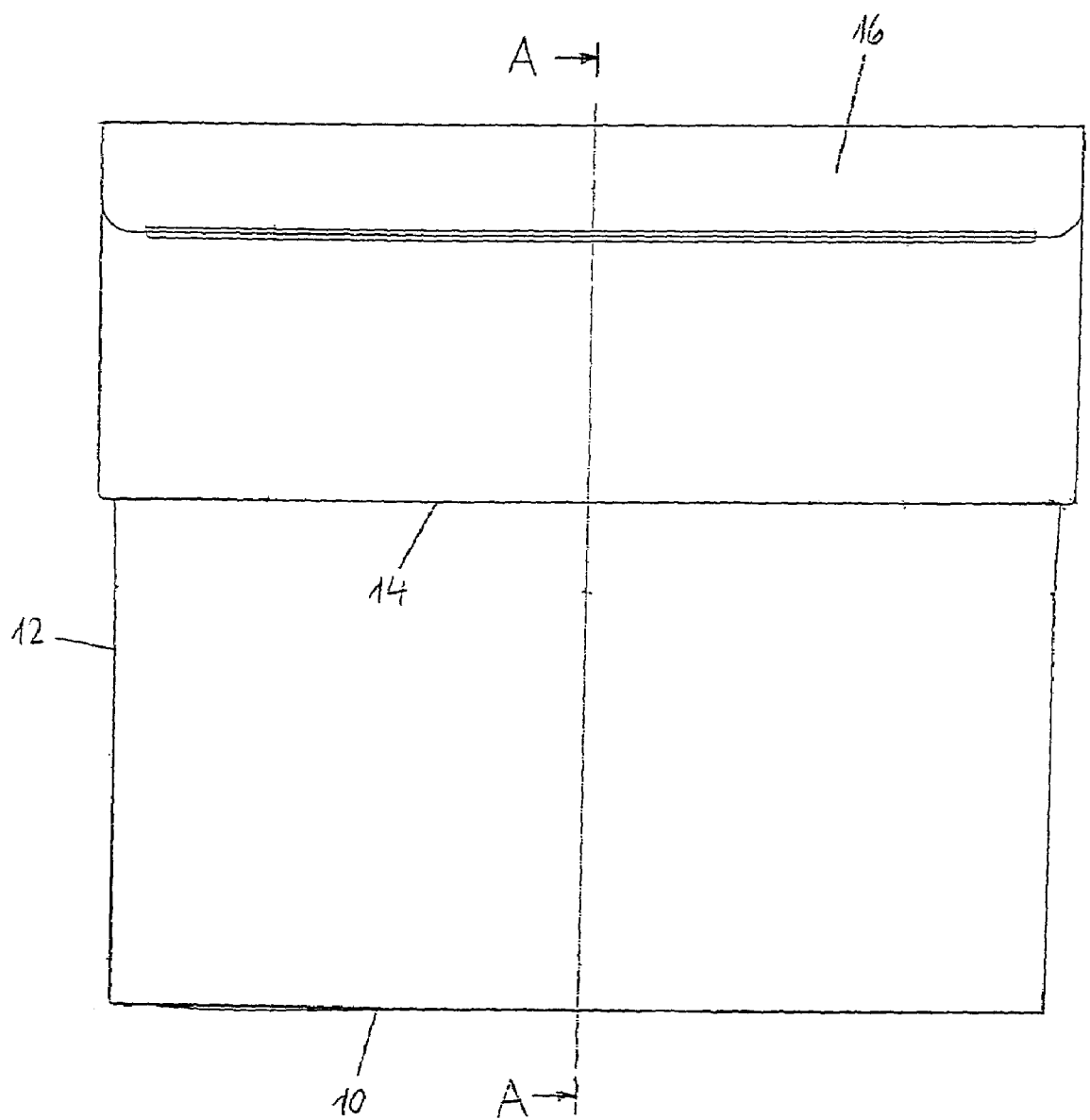

The shaping container is comprised of plastic and has essentially a quadratic shape. The floor 10 and the four sides 12 of the quadrant are closed, while the upper side of the shaping container is open. The shaping container forms in this manner a watertight basin.

At approximately ⅔ of the height of the side walls 12 a step 14 is formed, whereby the sidewalls 12 above the step 14 are displaced outwardly by the wall thickness of the sidewalls 12. At the upper rim of the sidewalls 12 an outwardly bowed circumscribing channel 16 is formed.

By the provision of the step 14 it becomes possible to stack the shaping containers in each other, whereupon respectively the upper shaping container engages the thereunder located shaping container, and is seated with its lower edge upon the step 14.

By the step 14 the inner volume of the shaping container is divided into an internal shape volume 18, which extends from the floor 10 up to the step 14, and a there-upon lying stack volume 20, which extends from the step 14 up to the upper rim of the sidewall 12.

The hams classified according to their size are assigned to the appropriate sized shaping container in such a manner, that the hams laid into the shaping containers fill the lower shape volume 18 and extend above the step 14 into the stack volume 20. Then the shaping containers filled with ham are stacked in each other. The respectively upper shaping container is thereby standing with its floor 10 upon the ham of the there-under located shaping container and places pressure on it. The ham is thereby pressed into the shape volume 18 and assumes this quadratic shape. If the respective ham is pressed into the shape volume 18, then the there-upon lying shaping container sits with its lower edge upon the step 14 of the there-under lying shaping container, so that the pressure exercised by the upper filled shaping container upon the respective ham is limited. From the lowermost to the uppermost shaping containers of the stack thus a similar pressure is exercised upon all hams.

The brine collecting in the shaping containers can climb along the sides of the stack volume 20, whereby excess brine is collected in the circumscribing channel 16, so that a running over and running out of brine is limited.

The invention claimed is:

1. A process for producing raw cured products, comprising:
    salting individual raw meat pieces with an amount of salt corresponding to the weight and optionally to the pH of the meat pieces,
    selecting at least two individualized single shaping containers based upon the size of at least two individual raw meat pieces, wherein each individualized shaping container includes closed watertight sidewalls and a floor and an open upper side for storing a single meat piece;
    individually storing each single raw meat piece in one of the individualized single shaping containers,
    stacking the individualized single shaping containers, with the raw meat pieces therein for storage, whereupon one shaping container respectively stands with its floor upon the raw meat piece introduced in the thereunder located shaping container and presses the meat piece to take the shape of its shaping container, and
    following storage, removing the raw meat piece from each shaping container and drying the raw meat piece, wherein each individual raw meat piece is cured with an even salt distribution corresponding to the weight and optionally to the pH of the meat piece.

2. A process as in claim 1, wherein said raw meat piece is raw ham.

3. A process as in claim 1, wherein said raw meat piece is de-boned raw ham.

4. A process as in claim 1, wherein the raw meat piece pressed in the shaping container is completely covered and closed off airtight by its brine.

5. A process according to claim 1, wherein the raw meat piece removed from the shaping container following storage is laid upon a grate and dried.

6. A process as in claim 5, wherein said drying is accompanied by or followed by smoking.

7. A process as in claim 1, wherein a starter culture is introduced into the shaping container.

8. A process as in claim 1, wherein said shaping container is in the shape of an open quadratic shape with a closed floor and closed sidewalls, and wherein the sidewalls exhibit an outwardly extending step, which divides the internal volume of the container into a lower shape volume and an upper stacking volume, and wherein, upon stacking, a respective upper shaping container is seated upon a lower shaping container.

9. A process for producing raw cured products, comprising salting individual raw meat pieces with an amount of salt corresponding to the weight and optionally to the pH of the meat pieces, selecting an individualized single shaping container based upon the size of the individual raw meat piece, wherein the individualized shaping container includes closed watertight sidewalls and a floor and an open upper side;

storing each raw meat piece in an individualized single shaping container, stacking the individualized single shaping containers, with the raw meat pieces therein, for storage whereupon one shaping container respectively stands with its floor upon the raw meat piece introduced in the there-under located shaping container and presses the meat piece to take the shape of its shaping container, and following storage, removing the raw meat piece from the shaping container and drying the raw meat piece, wherein the pieces of meat are hams, and wherein the hams are sorted into two or more size classes and are introduced into shaping containers of different sizes corresponding to these size classes, and wherein each individual raw meat piece is cured with an even salt distribution corresponding to the weight and optionally to the pH of the meat piece.

10. A process for producing raw cured products, comprising salting individual raw meat pieces with an amount of salt corresponding to the weight and optionally to the pH of the meat pieces, selecting an individualized single shaping container based upon the size of the individual raw meat piece, wherein the individualized shaping container includes closed watertight sidewalls and a floor and an open upper side;

storing each raw meat piece in an individualized single shaping container, of which the floor and sidewalls are closed watertight and the upper side is open, stacking the shaping containers, with the raw meat pieces therein, for storage whereupon one shaping container respectively stands with its floor upon the raw meat piece introduced in the there-under located shaping container and presses the meat piece to take the shape of its shaping container and whereby each individualized raw meat piece is cured with an even salt distribution, and following storage, removing the raw meat piece from the shaping container and drying the raw meat piece, wherein the pieces of meat are hams, and wherein the hams are individually weighed, optionally followed by determination of their pH, wherein the amount of salt is determined based upon the weight and optionally pH of the hams, wherein each ham is rubbed with salt and introduced into the shaping container, and wherein the salt up to the necessary salt amount is added to the ham lying in the shaping container following weighing, and wherein each individual raw meat piece is cured with an even salt distribution corresponding to the weight and optionally to the pH of the meat piece.

* * * * *